Figure 1:
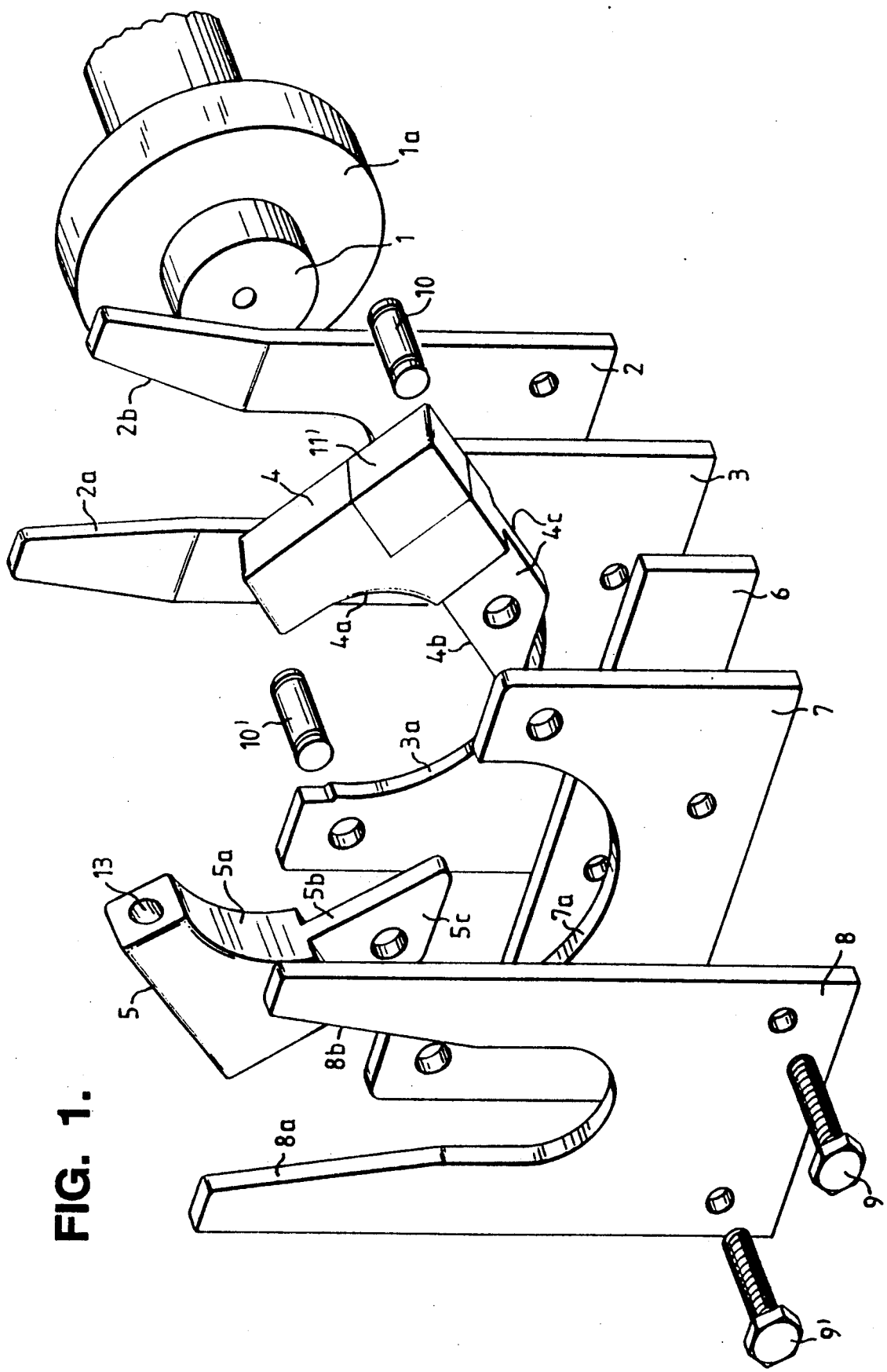

United States Patent [19]
Contzen

[11] Patent Number: 5,102,238
[45] Date of Patent: Apr. 7, 1992

[54] DEVICE FOR MOUNTING AND GUIDING AN AXLE OR SHAFT OR A BEARING RING

[75] Inventor: Klaus Contzen, Nidderau, Fed. Rep. of Germany

[73] Assignee: Leybold Aktiengesellschaft, Hanau, Fed. Rep. of Germany

[21] Appl. No.: 723,211

[22] Filed: Jun. 28, 1991

[30] Foreign Application Priority Data

Mar. 26, 1991 [DE] Fed. Rep. of Germany ....... 4109888

[51] Int. Cl.⁵ .............................................. F16C 17/02
[52] U.S. Cl. ....................................... 384/263; 384/24
[58] Field of Search ................. 384/263, 24, 273, 436, 384/437

[56] References Cited

U.S. PATENT DOCUMENTS

| | | | |
|---|---|---|---|
| 2,365,687 | 12/1944 | Curtis | 384/24 |
| 2,675,997 | 4/1954 | Osgood | 384/24 |
| 4,076,337 | 2/1978 | Childress | 384/24 |
| 4,326,756 | 4/1982 | Moroz | 384/24 |

FOREIGN PATENT DOCUMENTS 3218545  11/1983  Fed. Rep. of Germany.

Primary Examiner—Lenard A. Footland
Attorney, Agent, or Firm—Felfe & Lynch

[57] ABSTRACT

In a device for the quick change of a shaft, e.g., the shaft of a coil in web coating apparatus, the shaft of the coil is equipped at the ends with ball bearings which, after the change, are fixed in a bearing holder. To be able to perform the change simply, the seat of the bearing is multipartite. The two upper halves of the bearing holder are shaped so that the bearing automatically opens and closes when the shaft is changed. The lock-up of the bearing holder is signaled electrically at the switchboard.

4 Claims, 4 Drawing Sheets

DEVICE FOR MOUNTING AND GUIDING AN AXLE OR SHAFT OR A BEARING RING

The invention relates to an apparatus for mounting and guiding an axle or shaft or a bearing ring, having a bearing bracket and with a jaw forming with the bearing bracket a seat bore, the jaw being disposed for pivoting about a pin in the bearing bracket, and the bearing bracket being provided with guiding means whose confronting surfaces reach pair-wise above the reach of the jaw and at the same time spread V-wise upward. Such devices are necessary, for example, in continuous-web vapor depositing apparatus in which films are carried in a vacuum at high speeds over a vapor depositing source and coated with aluminum. Applications are, for example, packaging films or roll-type condensers for the electronic field.

The films are wound on a shaft and replaced every 1 to 2 hours in batch operations.

In large industrial web vapor depositing apparatus, film widths up to 3 meters are coated. The films are wound to form a drum about one meter in diameter. The coils, weighing tons, are carried at the end of a cable by an overhead crane to the desired position over the open vapor depositing apparatus and lowered into the bearing seat. As a rule this is accomplished as follows: a man standing on the floor operates the crane, while a second man climbs a ladder or other such means to the top of the winding apparatus and steers the coil by hand to the proper position. After the coil has been lowered in place both of the shaft bearings are closed by closing down the upper bearing half and dogging it down by appropriate means. This operation calls for some skill, especially when the apparatus is 3 meters high and the coil is 3 meters long.

Due to the difficulty of gaining access to the coil system with its great numbers of guide rollers, spreading rollers, measuring rollers and end rollers, replacement of the coil can be performed only by experienced personnel.

Cleanliness must also be preserved, i.e., the part of the apparatus that are in the vacuum should not be contaminated by footprints, for example, since this would increase the pumping time. On the other hand, the operation is hard to perform from a ladder, so that supporting oneself on the coil system is unavoidable in large apparatus.

Hence it becomes the objective of the invention to simplify the changing of a coil such that it can be performed by one man from the floor and will require no dangerous manipulation from a ladder.

This is accomplished in accordance with the invention in that at least two jaws of substantially the same configuration are movably disposed on the opposite sides of the bearing bracket and together with the bearing bracket form the bearing bore, each of the two jaws being provided with at least one finger-like lever which is arranged in each case on the side of the pivot of the jaw facing the bearing bracket and which extends into the reach of the bearing bore when the jaw is swung laterally.

Preferably one of the two jaws is provided with a recess whose longitudinal axis runs transversely of the shaft axis and above the plane established by the pins, or parallel or at an angle thereto, while for the purpose of anchoring the two closed jaws together, the opposite claw is provided with a corresponding recess in which a bolt is slidingly mounted, which enters into the opposite recess and produces a positive locking of the two jaws.

Whereas previously a second man had to perform this operation by means of a ladder or by climbing up on the apparatus or had to close the opened bearing by hand from a raised platform and secure it against opening by bolting it down, this can now be done in a simple manner by an electrically actuated closing mechanism, such as a short-stroke cylinder with locking bolts.

The locking means is advantageously motor-driven, for example through a pneumatically, hydraulically or electrically driven piston.

The locking together of the two jaws when they are in the closed state is best performed by remote control, such as an electrical signal, the feedback signal being in the form of a display, preferably a signal light.

Figure 2:
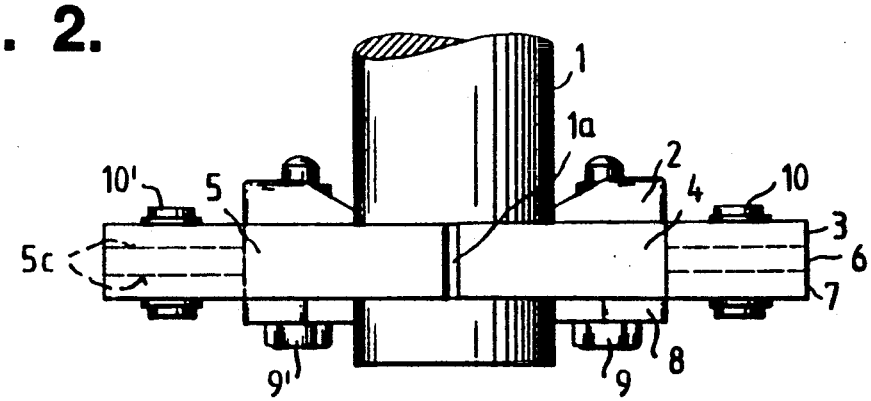
Figure 5:
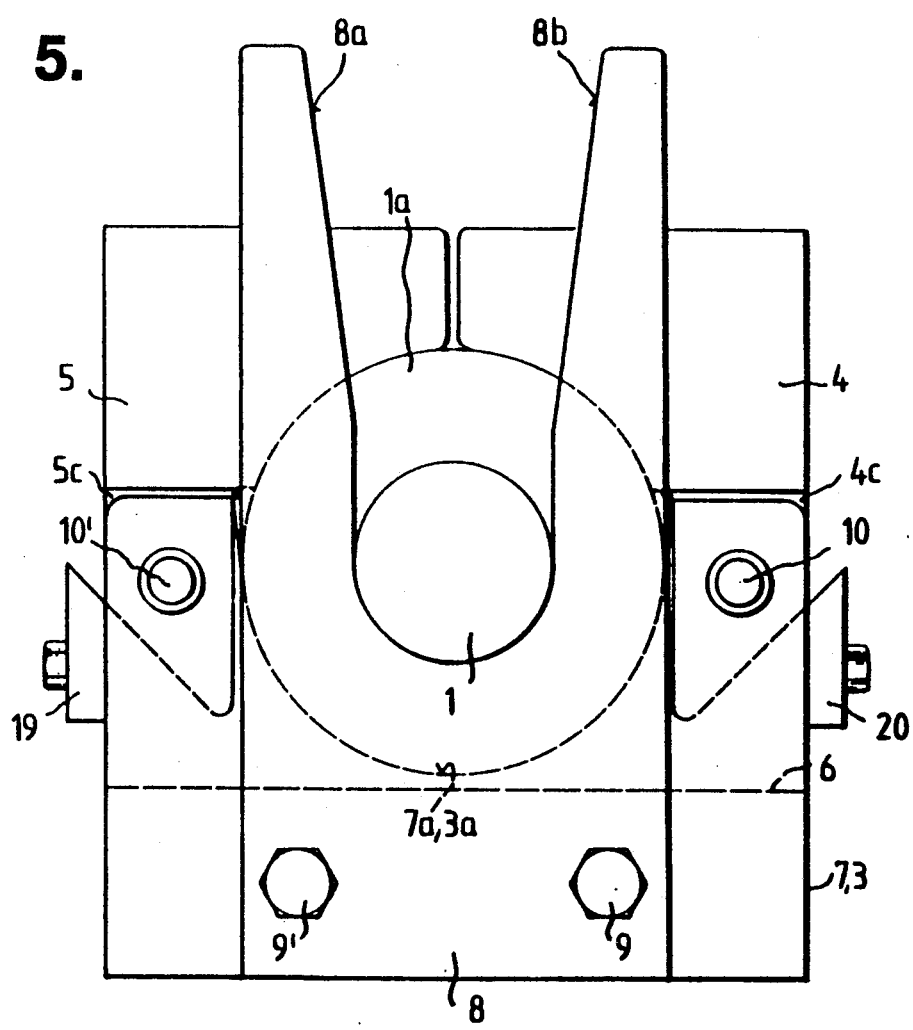
Figure 3:
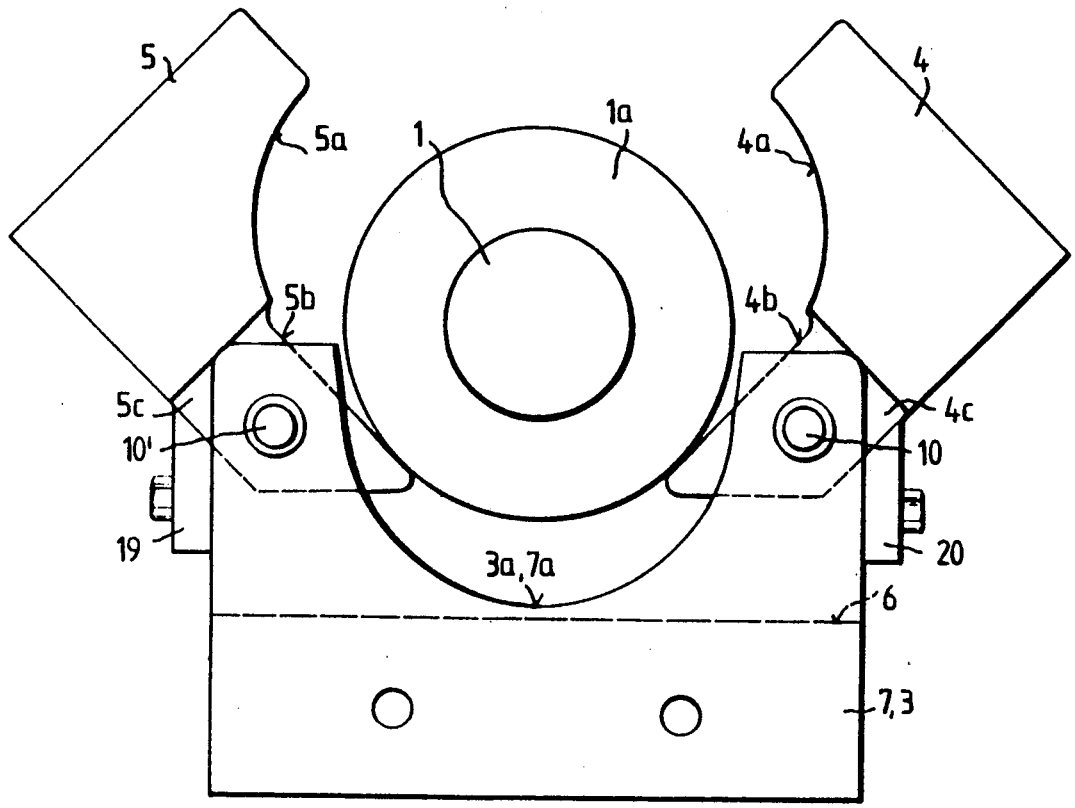
Figure 4:
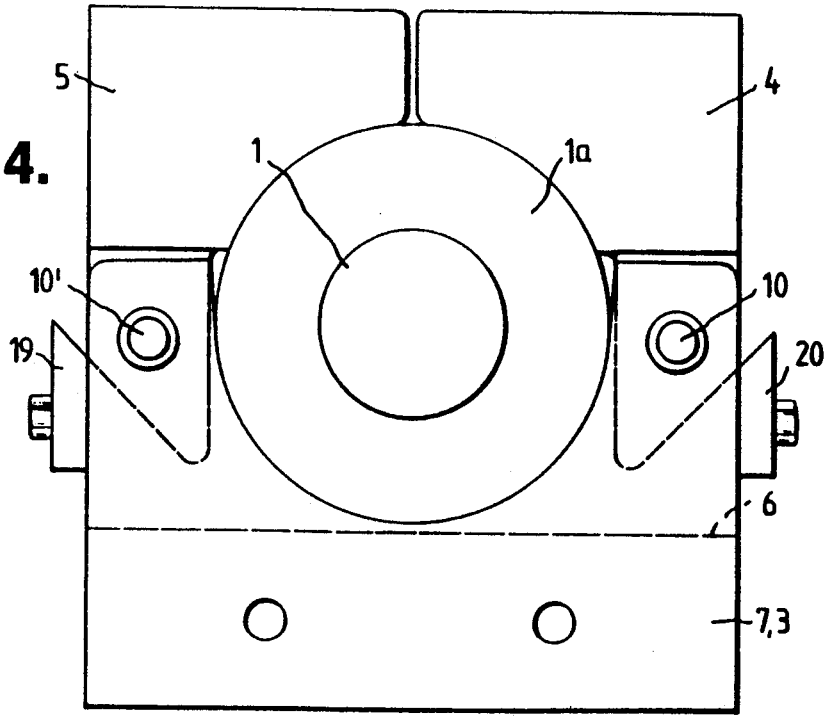
Figure 6:
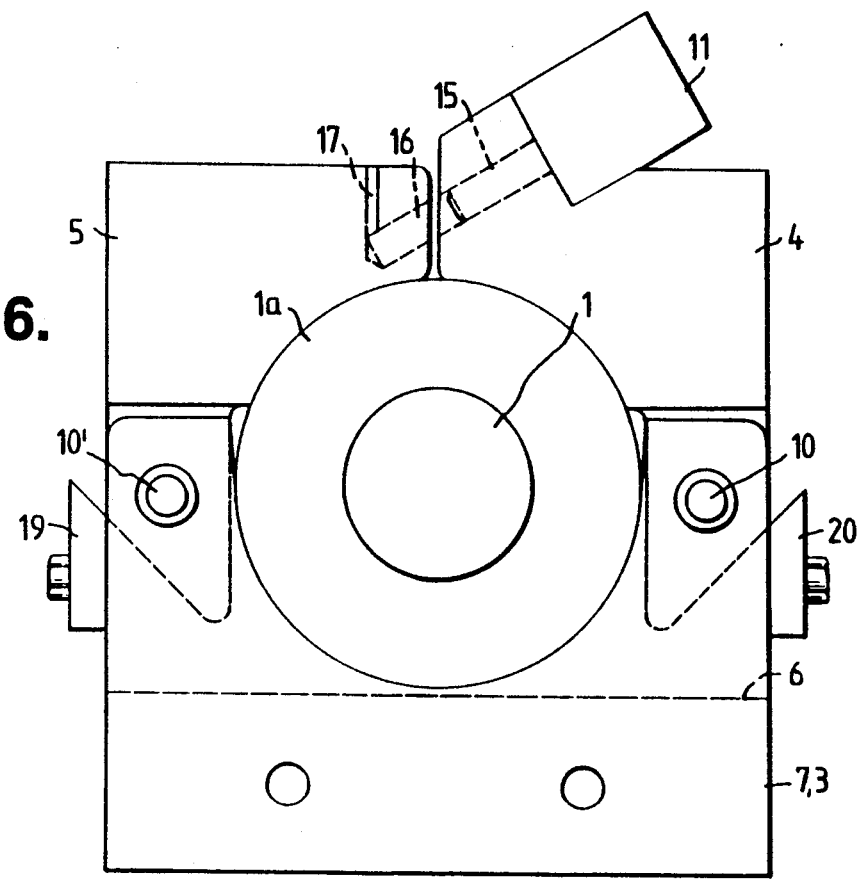
Figure 7:
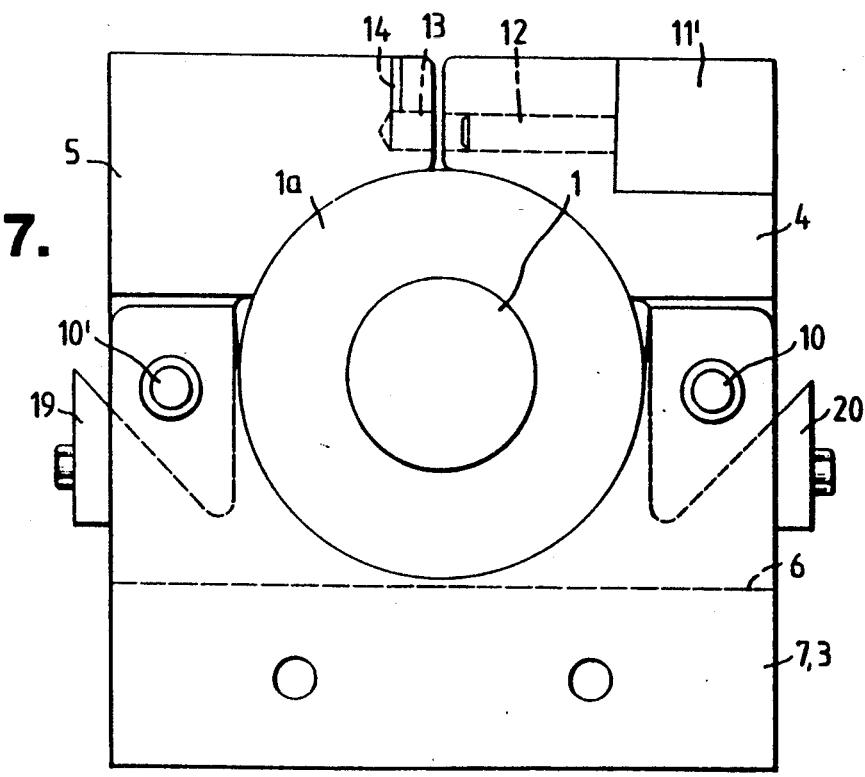

The invention is susceptible of a great variety of embodiments; one of them in shown in the appended drawings, wherein:

FIG. 1 is a perspective, exploded view of the parts of a device for mounting a shaft, on whose ends rolling bearings are placed, with a system for the automatic opening and closing of the bearing bracket when the shaft is replaced, FIG. 2 is a top view of the device in FIG. 1 in the closed state, FIG. 3 is an axial end view of the device of FIG. 1 with the jaws open as the shaft is lowered, FIG. 4 is an axial end view of the device of FIG. 1 with the jaws closed and, unlike FIG. 1, with abutments 19 and 20, establishing the open position of the jaws, FIG. 5 is an axial end view of the device of FIG. 1 with the means for aiding the introduction of the shaft to its final position, FIG. 6 shows an embodiment for locking the jaws of the device of FIG. 1, and FIG. 7 shows another embodiment for locking the jaws of the device of FIG. 1.

The device shown in FIG. 1 for mounting a shaft makes it possible in a simple manner to change a shaft 1 carrying, for example, a coil. At the ends of the shaft 1 rolling bearings 1a are provided as a rule, whose outside diameter is smaller than the shaft diameter (not shown in FIG. 1). Thus the shaft can be pushed through the coil in a simple manner and locked by means of clamping devices.

In changing a coil, it is suspended on cables from a lifting means, such as an overhead crane, and carried over the apparatus such that the shaft 1 can be lowered with the rolling bearing 1a onto the bottom bearing support consisting of the two base plates 3 and 7.

The bearing brackets 3 and 7 and the spacer plate 6 can also be combined as an integral body and have vertical bores for fastening the bearing bracket on the base. The bores are countersunk to accommodate the bolt heads. For the sake of simplicity these details are not shown in FIG. 1.

The two upper halves of the bearing mounting, jaws 4 and 5, are mounted between the two bearing brackets 3 and 7 so as to pivot about two pins 10 and 10'. In the closed state their bearing surfaces 4a and 5a encompass the rolling bearing 1a. In the open state they clear the way for the removal of the shaft.

The shape of the jaws is made such that when the shaft is removed upwardly the jaws automatically clear the path and are held open by gravity. Conversely, the finger-like shape of the jaws under the pivots 10 and 10' creates levers 4b and 5b which cause the jaws to close automatically when the rolling bearing 1a strikes against the edge of the lever 4b and 5b.

To simplify the pivoting of the jaws 4 and 5 between the bearing brackets 3 and 7 about the pivot pins 10 and 10', recesses 4c and 5c are provided in the embodiment in FIG. 1.

To facilitate the automatic introduction of a shaft when lowered, guiding means 2 and 8 are provided one on each side of the bearing brackets 3 and 7. These guiding means consist each of a plate with a shaft bore to accommodate the shaft, and this bore has a V-shaped opening at the top and abutment surfaces (2a, 2b and 8a, 8b, respectively).

The two guiding means are bolted to the bearing bracket with the screws 9 and 9'.

In the case of guiding means 2 facing the coil, the two abutment surfaces 2a and 2b are curved slightly inward to allow lateral clearance for the shaft as it is lowered.

FIG. 2 shows the shaft bearing in the closed state as a cross-sectional drawing. The two bearing brackets 3 and 7 are held apart by the spacer plate 6 such that the two jaws 4 and 5 can easily rotate about the pivot pins 10 and 10'.

It is clear in FIG. 3 how the automatic closing and opening works. The arrow indicates the closing process. As the shaft is lowered it strikes against the two abutment surfaces 4b and 5b of the two finger-shaped levers of the jaws and causes them to turn until surfaces 4a and 5a lie against the shaft. This state is represented in FIG. 4. Upon opening, i.e., when the shaft is lifted out, the bearing surfaces 4a and 5b serve as abutment surfaces for the opening movement, until the two jaws 4 and 5 drop of their own weight into the open position. This position is established by abutment plates screwed to the bearing brackets.

In FIG. 5 can be seen the shape of the guiding means 2 and 8. Guiding means 8 is cut to a V-shape and with its guiding surfaces 8a and 8b produces a positive guidance of the shaft as it is lowered to the end position.

Finally, two embodiments are shown in FIGS. 6 and 7 for locking the jaws closed.

One of the jaws 4,4' has cut-outs to accommodate a short-stroke jack 11,11'. The bolt 12,12' serving as the locking means is fastened to this jack. The bolt can be shifted in the bore 13, 16, such that it will enter into the blind hole 14, 17, in the opposite jaw and locks both jaws against opening.

For better degassing the blind hole 14, 17, is provided with a vent bore 15, 18.

The invention offers several possibilities for automatically closing and opeing bearing holders. In the case of the web coating apparatus, radial rolling bearings are used as a rule, which are installed on the turned-down end of the shaft such that the outside diameter of the rolling bearing is smaller than the shaft diameter. The shaft can thus easily be passed through the coil and be held in place with suitable devices. If the bearing is larger than the shaft diameter, the bearing can easily be drawn off by means of extension tubes.

It is also conceivable, however, for the tilting bearing to be configured as a sleeve bearing. In this case, which applies to slowly revolving bearing carrying a heavy weight load, the seat surfaces 3a, 7a and 5a must be machined with special care, since they are actually friction surfaces of the bearing. Closer tolerances are then also necessary for journaling the jaws 4, 5 and 4', 5' on the pins 10, 10'.

I claim:

1. Device for mounting and guiding an axle of shaft or a bearing ring, with a bearing bracket and with a jaw forming with the bearing bracket a seat bore, the jaw being pivoted on a journal pin on the bearing bracket, and the bearing bracket being provided with guiding means whose confronting guiding surfaces reach pairwise above the range of at least two jaws and at the same time expand upwardly V-wise, characterized in that the at least two jaws of substantially equal configuration are disposed pivotingly on opposite sides of the bearing bracket and together with the bearing bracket form the seat bore, each of the two jaws being provided each with a finger-shaped lever, which is provided each on the side of the journal pin of the jaw facing the bearing bracket, and extends into the area of the seat bore when the jaw is swung laterally away.

2. Device for mounting according to claim 1, characterized in that one of the two jaws is provided with a recess whose longitudinal axis runs transversely of the shaft axis and above the plane, which is established by the pins, parallel or at an angle thereto, and that for the purpose of the anchoring together of the two closed jaws the opposite jaw (4, 4') is provided with a corresponding recess in which a closing means is displaceably mounted, which enters into the opposite recess and produces a form-locking joining of the two jaws.

3. Device according to claim 2 characterized in that the closing means is motor-driven, through a pneumatically, hydraulically or electrically driven piston.

4. Device according to claim 3 characterized in that the anchoring together of the two jaws in the closed state is performed through a remote control, the signal feed-back being perceptible through a signal light display.

* * * * *